US010338830B2

(12) United States Patent
Zhou et al.

(10) Patent No.: US 10,338,830 B2
(45) Date of Patent: Jul. 2, 2019

(54) METHODS FOR ACCESSING A SOLID STATE DISK FOR QOS (QUALITY OF SERVICE) AND APPARATUSES USING THE SAME

(71) Applicant: Shannon Systems Ltd., Shanghai (CN)

(72) Inventors: Zhen Zhou, Shanghai (CN);
Ningzhong Miao, Shanghai (CN)

(73) Assignee: SHANNON SYSTEMS LTD., Shanghai (CN)

( * ) Notice: Subject to any disclaimer, the term of this patent is extended or adjusted under 35 U.S.C. 154(b) by 110 days.

(21) Appl. No.: 15/663,946

(22) Filed: Jul. 31, 2017

(65) Prior Publication Data
US 2018/0101319 A1    Apr. 12, 2018

(30) Foreign Application Priority Data

Oct. 8, 2016    (CN) .......................... 2016 1 0879561

(51) Int. Cl.
*G06F 3/06*    (2006.01)
*G06F 5/06*    (2006.01)
*G06F 9/455*    (2018.01)

(52) U.S. Cl.
CPC .......... *G06F 3/0619* (2013.01); *G06F 3/0631* (2013.01); *G06F 3/0659* (2013.01); *G06F 3/0674* (2013.01); *G06F 5/065* (2013.01); *G06F 9/45558* (2013.01); *G06F 2009/45579* (2013.01); *G06F 2009/45583* (2013.01)

(58) Field of Classification Search
CPC .... G06F 3/0619; G06F 3/0631; G06F 3/0659; G06F 3/0674
See application file for complete search history.

(56) References Cited

U.S. PATENT DOCUMENTS

| 8,959,249 | B1* | 2/2015 | Love | G06F 3/0611 |
| | | | | 710/6 |
| 2011/0292792 | A1 | 12/2011 | Zou et al. | |
| 2013/0262649 | A1 | 10/2013 | Shimmitsu et al. | |
| 2013/0326064 | A1 | 12/2013 | Gulati et al. | |
| 2014/0282514 | A1* | 9/2014 | Carson | G06F 9/45533 |
| | | | | 718/1 |
| 2016/0299693 | A1* | 10/2016 | Sakdeo | G06F 3/0605 |
| 2017/0024132 | A1* | 1/2017 | Jun | G06F 3/0688 |
| 2017/0324813 | A1* | 11/2017 | Jain | H04L 41/5009 |
| 2018/0210650 | A1* | 7/2018 | Alexeev | G06F 17/30 |

FOREIGN PATENT DOCUMENTS

| TW | I220198 B | 8/2004 |
| TW | 201126330 A | 8/2011 |
| TW | 201519607 A | 5/2015 |

* cited by examiner

*Primary Examiner* — Ryan Bertram
(74) *Attorney, Agent, or Firm* — McClure, Qualey & Rodack, LLP (57) ABSTRACT

The invention introduces a method for accessing a solid state disk for QoS (Quality of Service), performed by a processing unit, including at least the following steps: obtaining execution histories of VMs (virtual machines); selecting one of the FIFO (First-In-First-Out) queues according to the execution histories and QoS; obtaining a first data access request, which was entered earliest in the selected FIFO queue; and directing a storage device to complete a data access operation according to the first data access request.

14 Claims, 11 Drawing Sheets

METHODS FOR ACCESSING A SOLID STATE DISK FOR QOS (QUALITY OF SERVICE) AND APPARATUSES USING THE SAME

CROSS REFERENCE TO RELATED APPLICATIONS

This Application claims priority of China Patent Application No. 201610879561.2, filed on Oct. 8, 2016, the entirety of which is incorporated by reference herein.

BACKGROUND

Technical Field

The present invention relates to database virtualization, and in particular to methods for accessing a solid state disk for QoS (Quality of Service) and apparatuses using the same.

Description of the Related Art

Database virtualization is the decoupling of the database layer, which lies between the storage and application layers within the application stack. Virtualization of the database layer enables a shift away from the physical, toward the logical or virtual. Virtualization enables computation and storage resources to be pooled and allocated on demand. Different applications for different customers are run in the virtualization environment for accessing a shared storage device. The conventional method may divide physical address space for different applications to prevent data from leaking or being modified by an unwanted user. However, it is difficult to prevent one application from using more than a predefined share of I/O performance resulting in others starving. Accordingly, what is needed are methods for accessing a solid state disk for QoS (Quality of Service) and apparatuses using the same to address the aforementioned problems.

BRIEF SUMMARY

An embodiment of the invention introduces a method for accessing a solid state disk for QoS (Quality of Service), performed by a processing unit, including at least the following steps: obtaining execution histories of VMs (virtual machines); selecting one of the FIFO (First-In-First-Out) queues according to the execution histories and QoS; obtaining a first data access request, which was entered earliest in the selected FIFO queue; and directing a storage device to complete a data access operation according to the first data access request.

An embodiment of the invention introduces an apparatus for accessing a solid state disk for QoS at least containing a memory and a processing unit. The memory allocates space for FIFO queues. The processing unit, coupled to the memory, obtains execution histories of VMs, selects one of the FIFO queues according to the execution histories and QoS, obtains a first data access request, which was entered earliest in the selected FIFO queue and directs a storage device to complete a data access operation according to the first data access request.

A detailed description is given in the following embodiments with reference to the accompanying drawings.

BRIEF DESCRIPTION OF THE DRAWINGS

The present invention can be fully understood by reading the subsequent detailed description and examples with references made to the accompanying drawings, wherein.

DETAILED DESCRIPTION

The following description is of the best-contemplated mode of carrying out the invention. This description is made for the purpose of illustrating the general principles of the invention and should not be taken in a limiting sense. The scope of the invention is best determined by reference to the appended claims.

The present invention will be described with respect to particular embodiments and with reference to certain drawings, but the invention is not limited thereto and is only limited by the claims. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term) to distinguish the claim elements.

Figure 1:
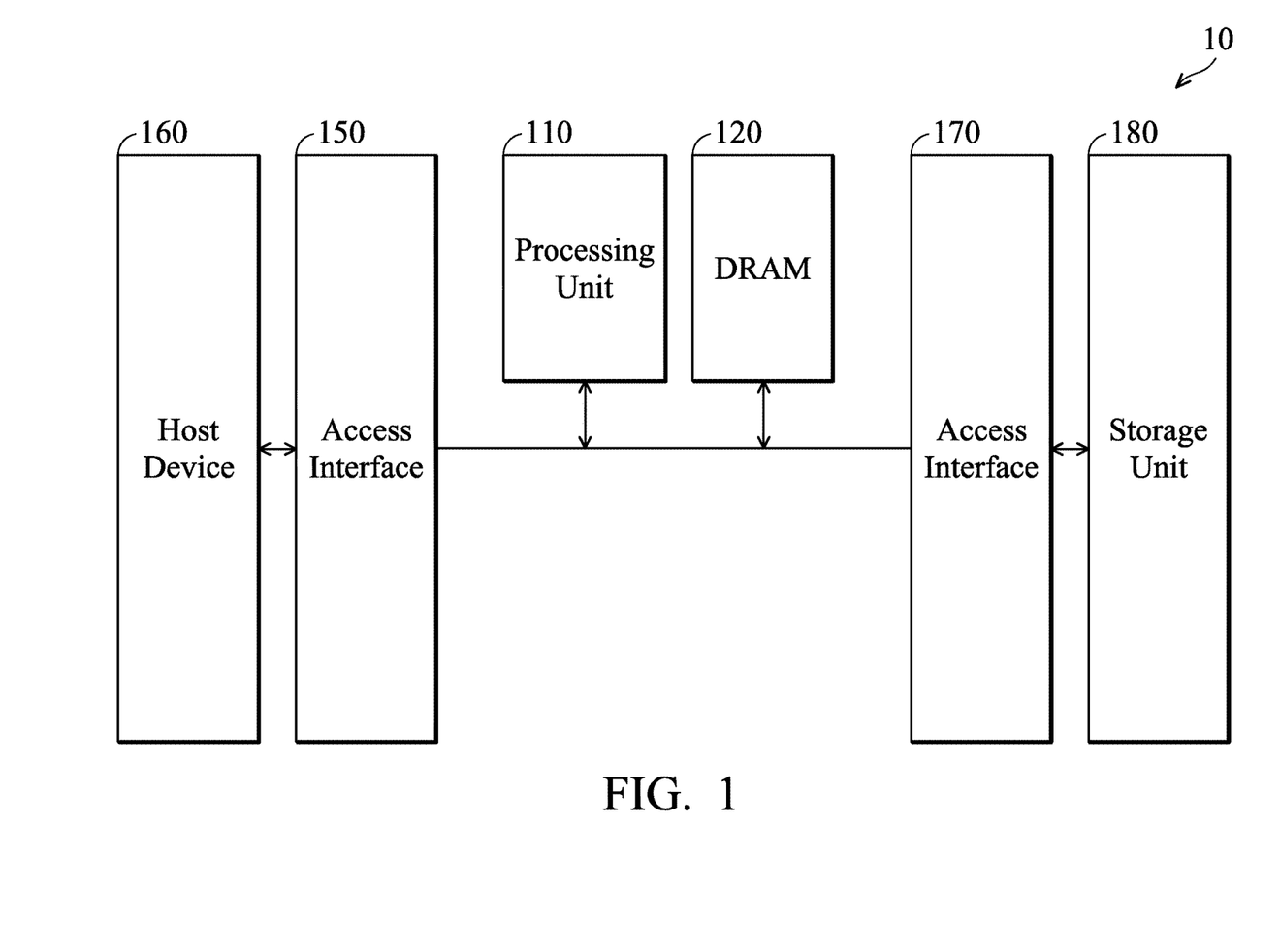
FIG. 1 is the system architecture of a flash memory according to an embodiment of the invention.

FIG. 1 is the system architecture of a flash memory according to an embodiment of the invention. The system architecture 10 of the flash memory contains a processing unit 110 configured to write data into a designated address of a storage unit 180, and read data from a designated address thereof. Specifically, the processing unit 110 writes data into a designated address of the storage unit 180 through an access interface 170 and reads data from a designated address thereof through the same interface 170. The processing unit 110 can be implemented in numerous ways, such as with dedicated hardware, or with general-purpose hardware (e.g., a single processor, multiple processors or graphics processing units capable of parallel computations, etc.) that is programmed using microcode or software instructions to perform the functions recited herein. The system architecture 10 uses several electrical signals for coordinating commands and data transfer between the processing unit 110 and the storage unit 180, including data lines, a clock signal and control lines. The data lines are employed to transfer commands, addresses and data to be written and read. The control lines are utilized to issue control signals, such as CE (Chip Enable), ALE (Address Latch Enable), CLE (Command Latch Enable), WE (Write Enable), etc. The access interface 170 may communicate with the storage unit 180 using an SDR (Single Data Rate) protocol or a DDR (Double Data Rate) protocol, such as ONFI (open NAND flash interface), DDR toggle, or others. The processing unit 110 may communicate with the host device 160 through an access interface 150 using a standard protocol, such as USB (Universal Serial Bus), ATA (Advanced Technology Attachment), SATA (Serial ATA), PCI-E (Peripheral Component Interconnect Express) or others.

Figure 2:
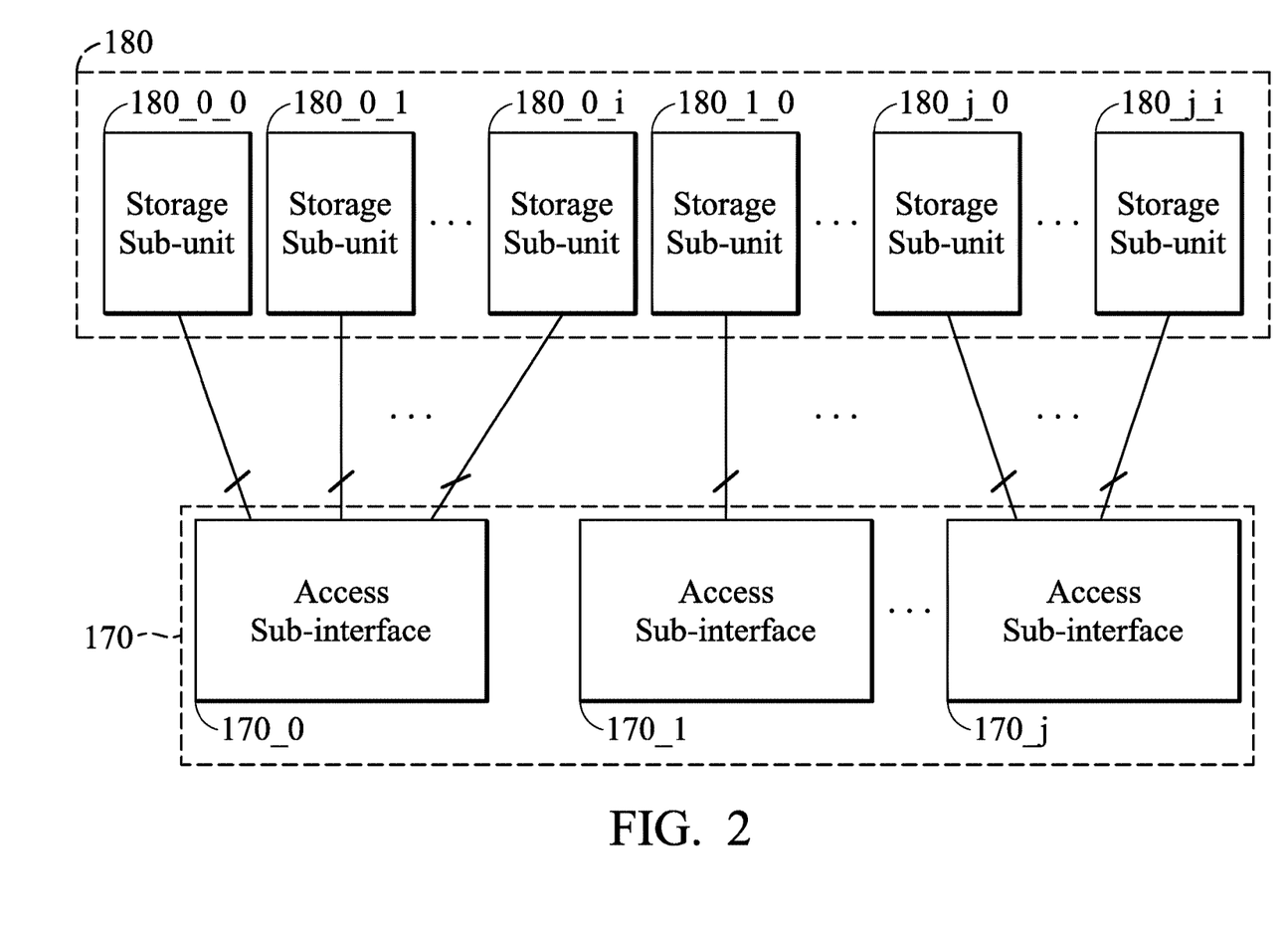
FIG. 2 is a schematic diagram illustrating interfaces to storage units of a flash storage according to an embodiment of the invention.
Figure 3:
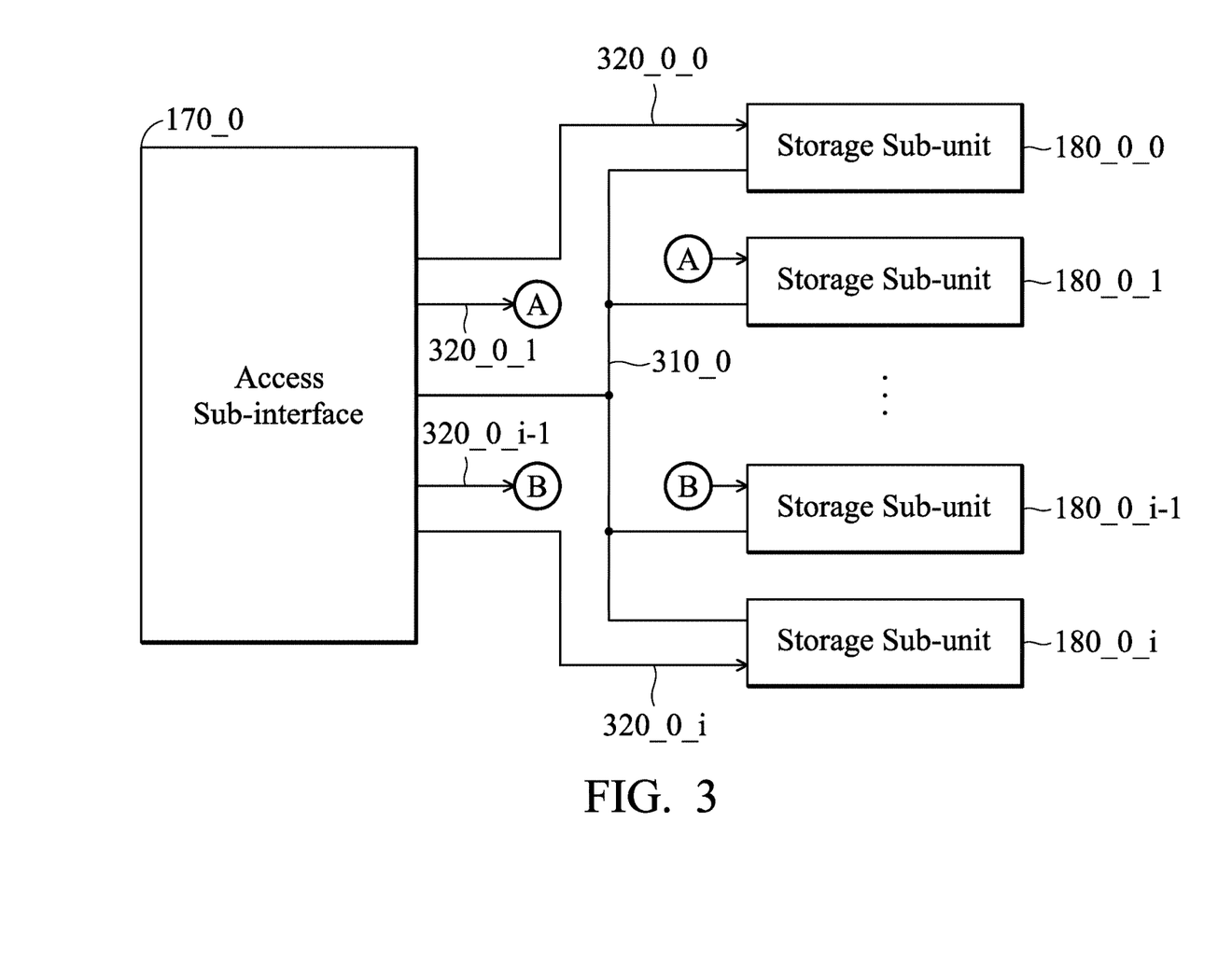
FIG. 3 is a schematic diagram depicting connections between one access sub-interface and multiple storage sub-units according to an embodiment of the invention.

The storage unit 180 may contain multiple storage sub-units and each storage sub-unit may be practiced in a single die and use a respective access sub-interface to communicate with the processing unit 110. FIG. 2 is a schematic diagram illustrating interfaces to storage units of a flash storage according to an embodiment of the invention. The flash memory 10 may contain j+1 access sub-interfaces 170_0 to 170_j, where the access sub-interfaces may be referred to as channels, and each access sub-interface connects to i+1 storage sub-units. That is, i+1 storage sub-units may share the same access sub-interface. For example, assume that the flash memory contains 4 channels (j=3) and each channel connects to 4 storage sub-units (i=3): The flash memory 10 has 16 storage sub-units 180_0_0 to 180_j_i in total. The processing unit 110 may direct one of the access sub-interfaces 170_0 to 170_j to program data into the designated storage sub-unit. Each storage sub-unit has an independent CE control signal. That is, it is required to enable a corresponding CE control signal when attempting to perform data programing into a designated storage sub-unit via an associated access sub-interface. It is apparent that any number of channels may be provided in the flash memory 10, and each channel may be associated with any number of storage sub-units, and the invention should not be limited thereto. FIG. 3 is a schematic diagram depicting connections between one access sub-interface and multiple storage sub-units according to an embodiment of the invention. The processing unit 110, through the access sub-interface 170_0, may use independent CE control signals 320_0_0 to 320_0_i to select one of the connected storage sub-units 180_0_0 and 180_0_i, and then program data into the designated location of the selected storage sub-unit via the shared data line 310_0.

Figure 4:
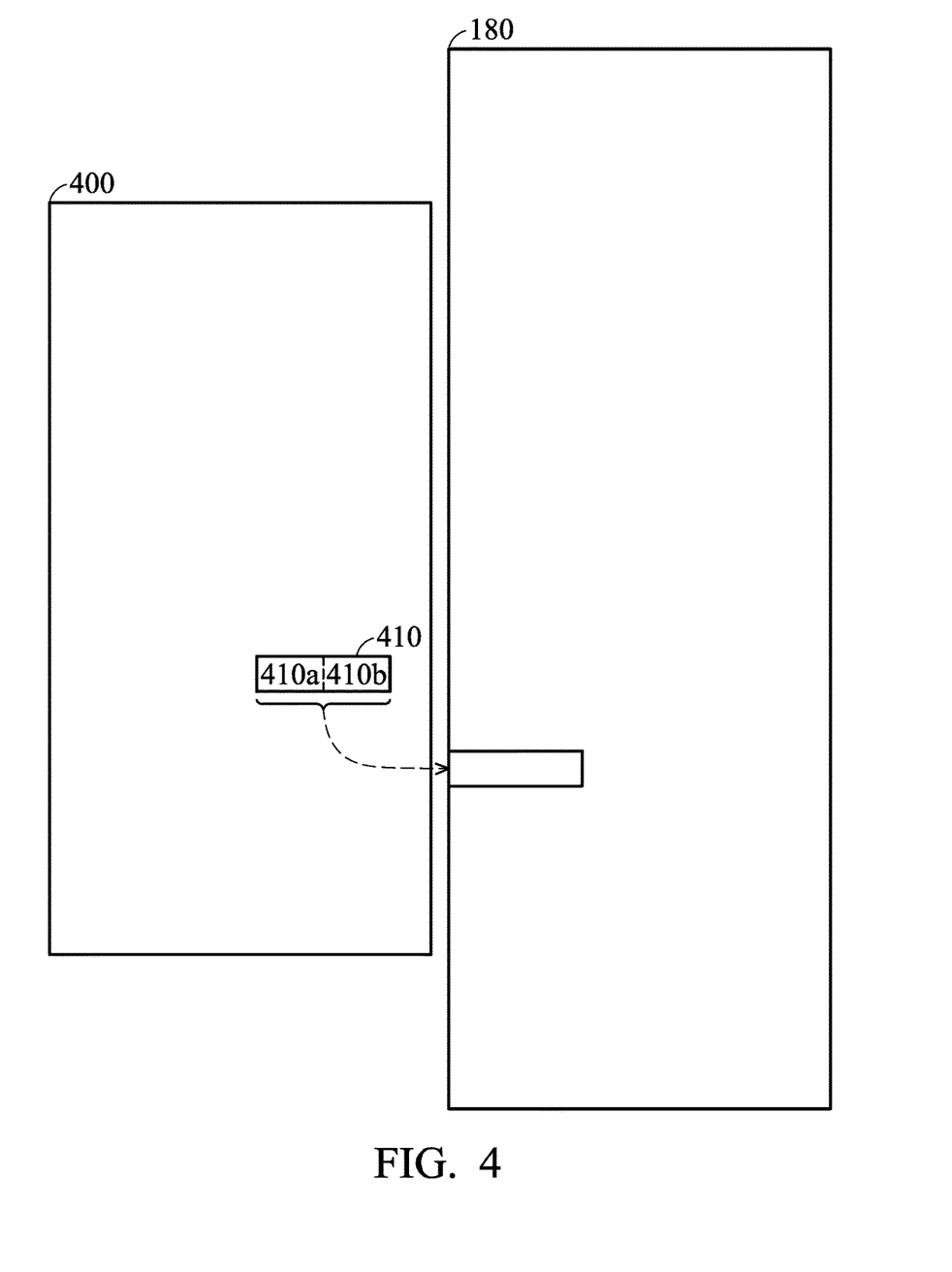
FIG. 4 is a schematic diagram illustrating the physical storage mapping according to an embodiment of the invention.
Figure 5:
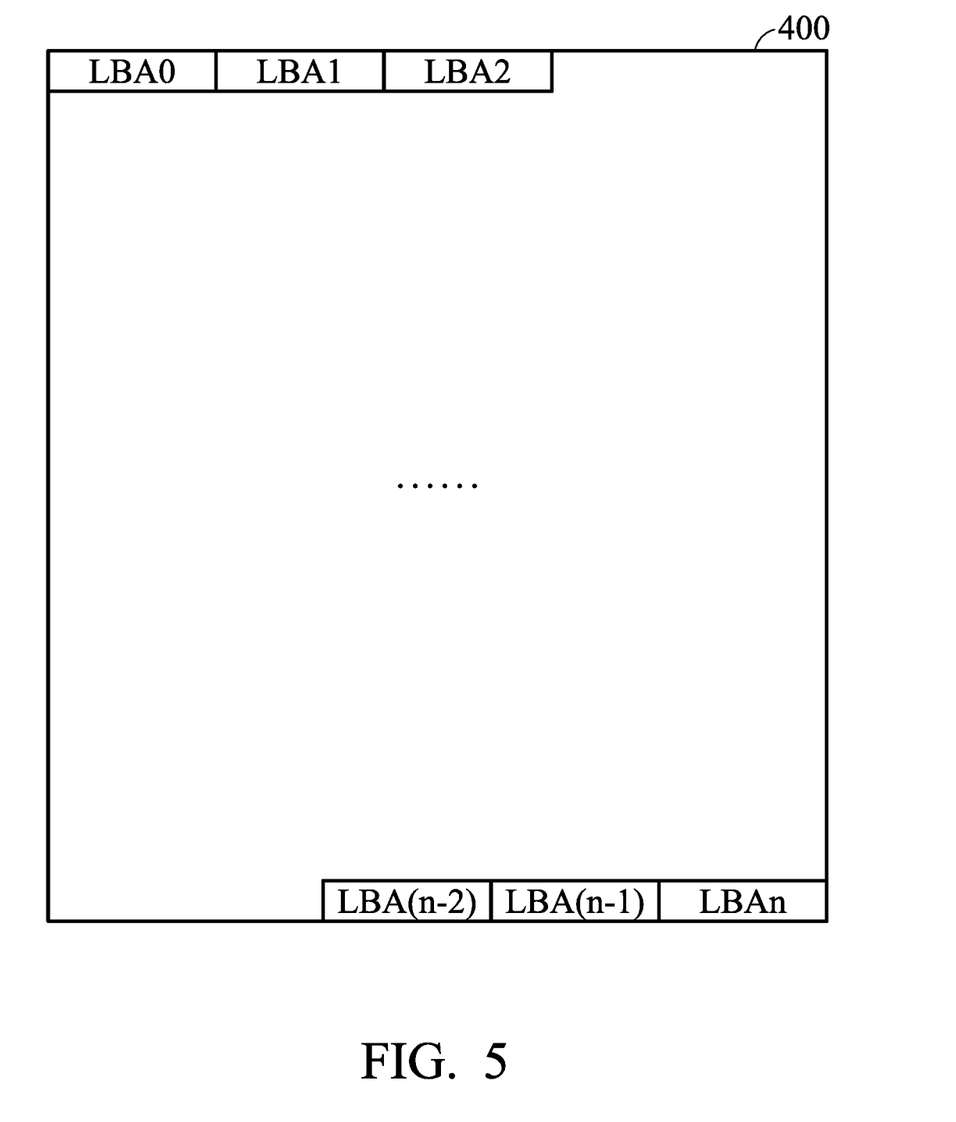
FIG. 5 is a schematic diagram of a storage mapping table according to an embodiment of the invention.

The host device 160 may provide an LBA (Logical Block Address) to the processing unit 110 through the access interface 150 to indicate a particular region for data to be read from or written to. However, in order to optimize the data write efficiency, the access interface 170 distributes data with continuous LBAs across different physical regions of the storage unit 180. Thus, a storage mapping table, also referred to as an H2F (Host-to-Flash) table, is stored in a DRAM (Dynamic Random Access Memory) 120 to indicate which location in the storage unit 180 the data of each LBA is physically stored in. FIG. 4 is a schematic diagram illustrating the physical storage mapping according to an embodiment of the invention. The storage mapping table 400 stores information regarding which location in the storage unit 180 data of each logical storage address is physically stored in, and the information is placed in order of the logical storage addresses. The logical storage addresses may be represented by LBAs, and each LBA is associated with a fixed-length of physical storage space, such as 256K, 512K or 1024K bytes. For example, the storage mapping table 400 stores physical location information from LBA0 to LBA65535 in sequence. The physical location information 410 of a given number of continuous logical blocks may be indicated in four bytes, of which two bytes 410a record a block number and the other two bytes 410b record a unit number. For example, the four bytes may indicate a start block number and a start unit number of eight physical blocks, and the eight physical blocks may collectively be referred to as a host page. The storage mapping table 400 may need space ranging from 64M to 1 G bytes. Because the NAND flash devices are not random access, in order to improve the data write efficiency, the host device 160 is required to provide at least one logical block of continuous data, such as 512 bytes, such that the storage device 180 can program the data into the storage unit 180 in an efficient way. When the host device 160 writes data of different logical blocks, for example, LBA0, LBA1000, LBA4500 and LBA10000, the corresponding physical location information of the storage mapping table 400 of the DRAM 120 is updated accordingly. FIG. 5 is a schematic diagram of a storage mapping table according to an embodiment of the invention. The storage mapping table 400 contains physical location information of n logical blocks, LBA0 to LBA(n−1) in a row.

Figure 6:
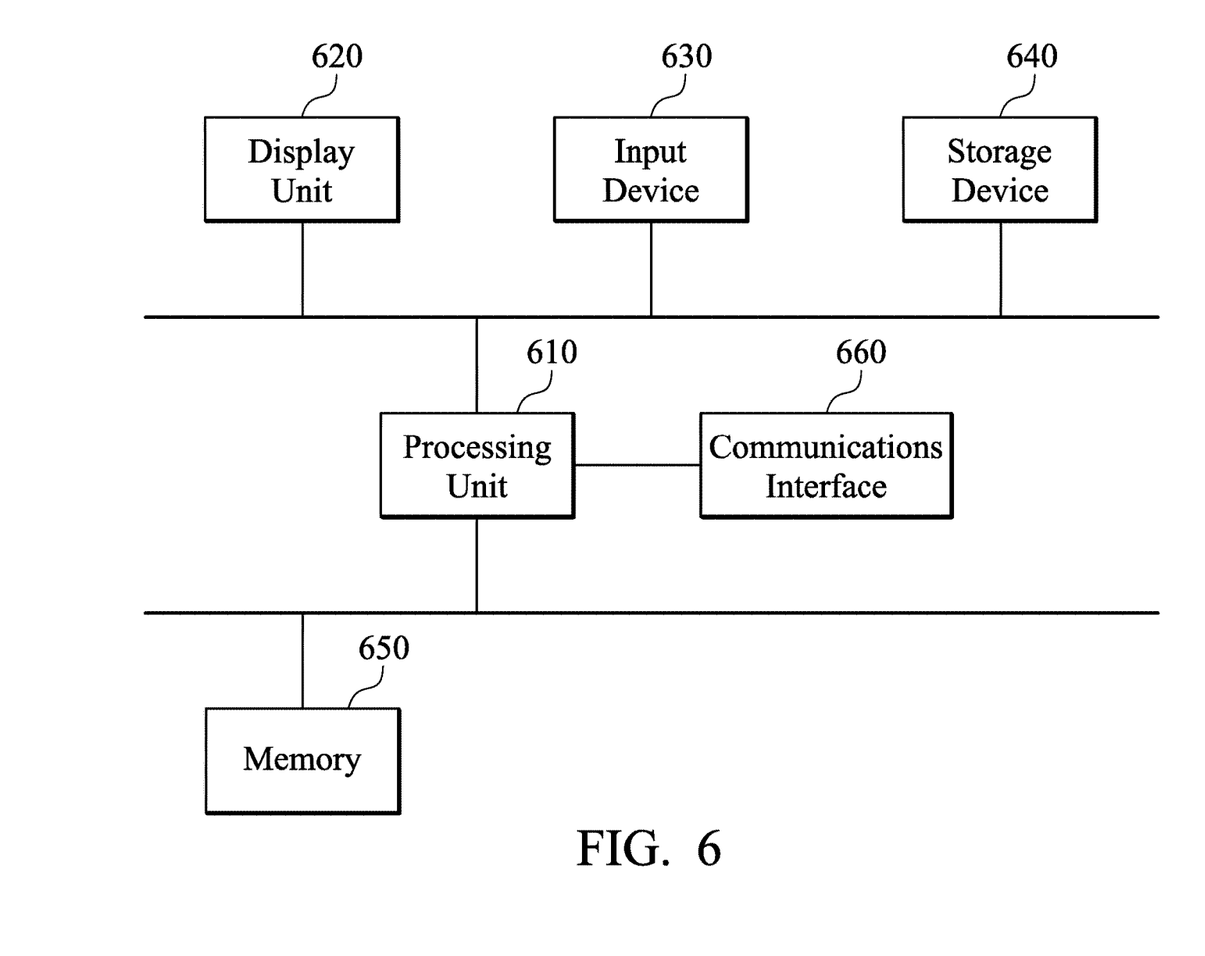
FIG. 6 is the system architecture of a computer apparatus according to an embodiment of the invention.

FIG. 6 is the system architecture of a computer apparatus according to an embodiment of the invention. The system architecture may be practiced in a desktop computer, a notebook computer, a mobile phone, at least containing a processing unit 610. The processing unit 610 can be implemented in numerous ways, such as with dedicated hardware, or with general-purpose hardware (e.g., a single processor, multiple processors or graphics processing units capable of parallel computations, etc.) that is programmed using microcode, macrocode or software instructions to perform the functions recited herein. The processing unit 610 may contain one or more ALUs (Arithmetic and Logic Units) and bit shifters. The ALU is responsible for performing Boolean operations (such as, AND, OR, NOT, NAND, NOR, XOR, XNOR, etc.) and also for performing integer addition and subtraction. The bit shifter is responsible for shifts and rotations. The system architecture further includes a memory 650 for storing necessary data in execution, such as constants, variables, data tables, etc. A communications interface 660 is included in the system architecture and the processing unit 610 can thereby communicate with another electronic apparatus. The communications interface 660 may be a wireless telecommunications module, a LAN (Local Area Network) communications module or a WLAN (Wireless LAN) communications module. The wireless telecommunications module may contain a modem supporting 2G, 3G, 4G or advanced technology, or any combination thereof. The system architecture further includes one or more input devices 630 to receive user input, such as a keyboard, a mouse, a touch panel, etc. A user may press hard keys on the keyboard to input characters, control a mouse pointer on a display by operating the mouse, or control an executed application with one or more gestures made on the touch panel. Examples of the gestures include, but are not limited to, a single-click, a double-click, a single-finger drag, and a multiple finger drag. A display unit 620 may include a display panel, such as a TFT-LCD (Thin film transistor liquid-crystal display) panel or an OLED (Organic Light-Emitting Diode) panel, to display input letters, alphanumeric characters, symbols, dragged paths, drawings, or screens provided by an application for the user to view. A storage device 640 stores a wide range of electronic files, such as Web pages, digital documents, video files, audio files, etc. The processing unit 610 may be treated as the host device 160 of FIG. 1. The storage device 640 may be a SSD (Solid State Disk), including the access interface 150, the processing unit 110, the DRAM 120, the access interface 170 and the storage unit 180, as shown in FIG. 1.

Figure 7:
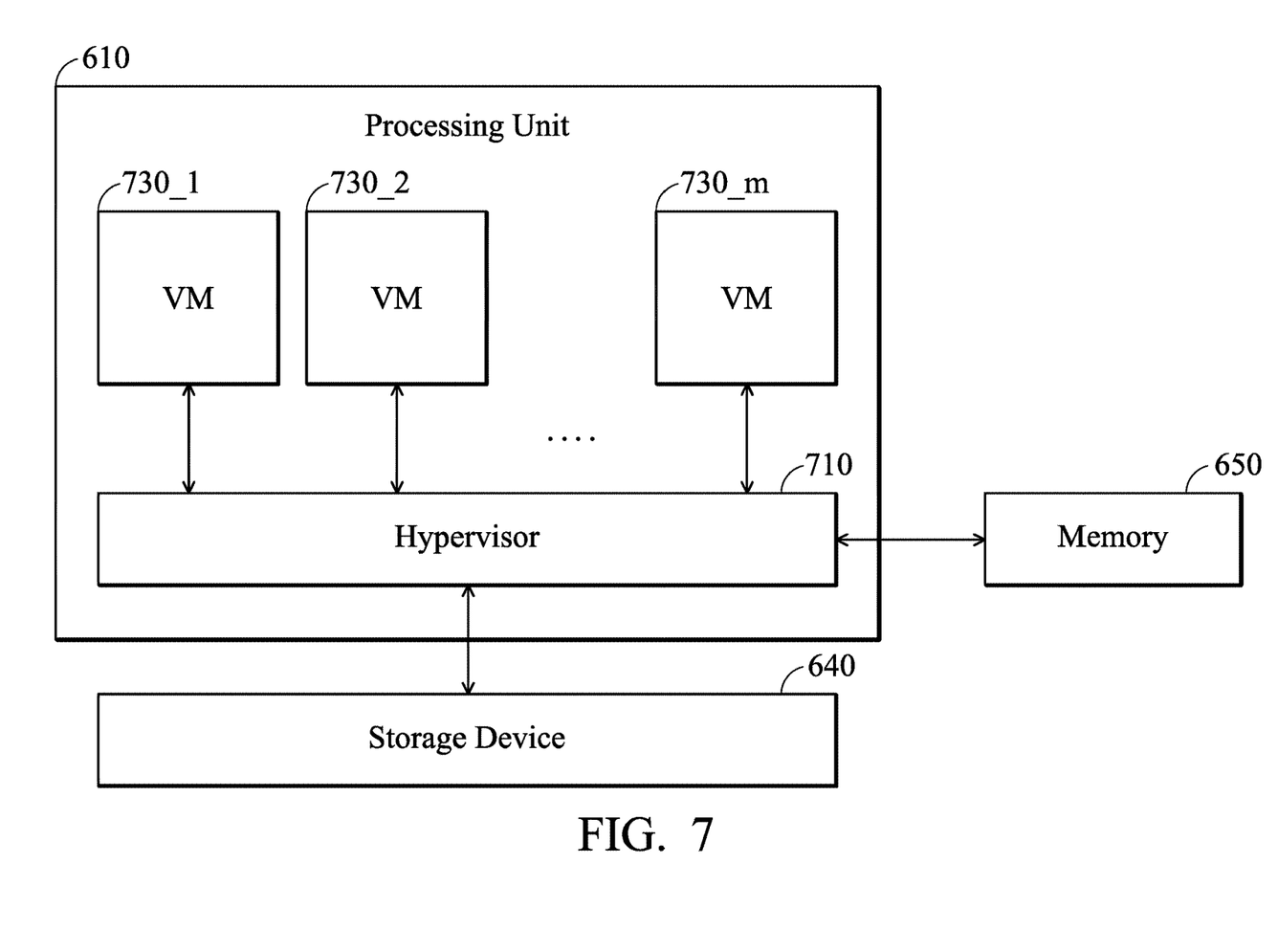
FIG. 7 is a system block diagram according to an embodiment of the invention.
Figure 8:
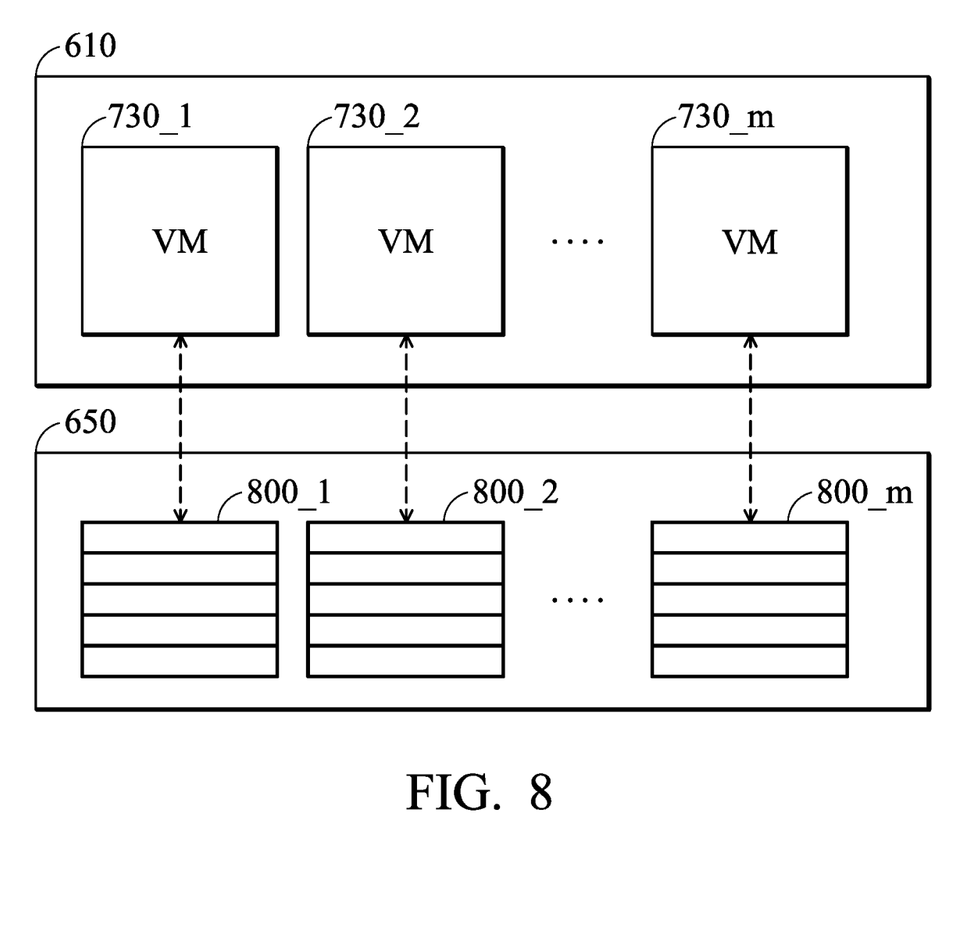
FIG. 8 is a schematic diagram of VMs and FIFO queues according to an embodiment of the invention.
Figure 9:
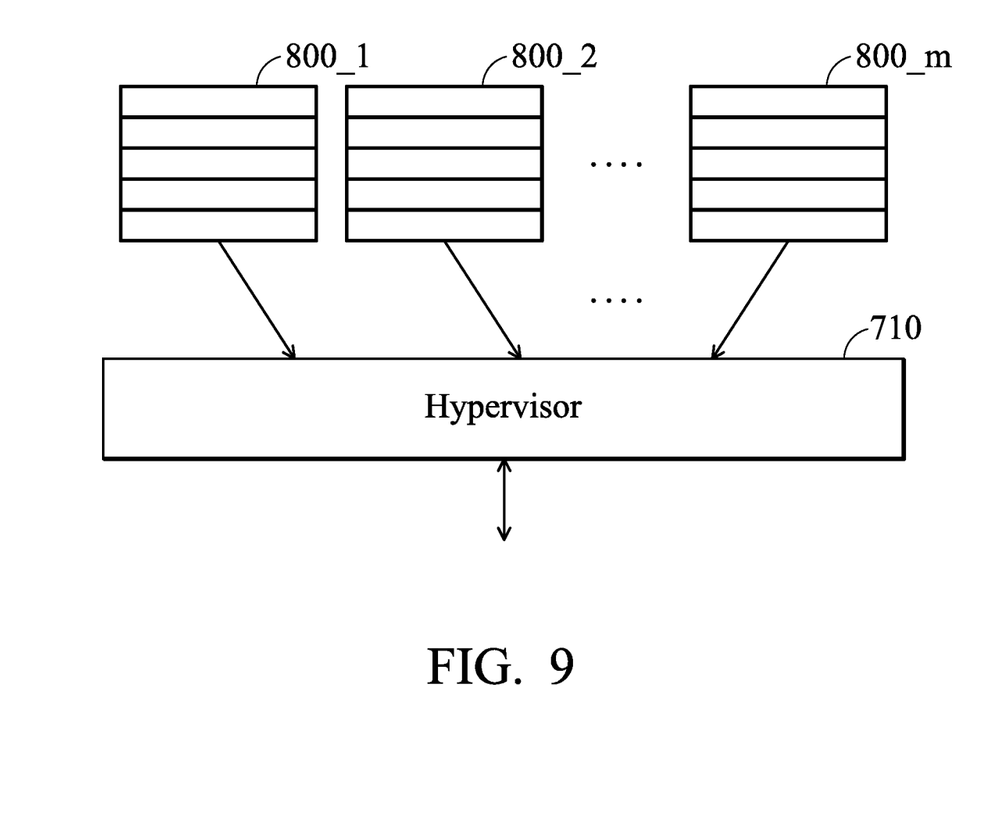
FIG. 9 is a schematic diagram for scheduling data access requests according to an embodiment of the invention.

In order to address the conventional drawbacks, an embodiment of the invention introduces a technology practiced in the host device 160 to schedule data access requests of different VMs (Virtual Machines) according to QoS (Quality of Service) of the VMs. The VM is a software implementation of a computer system that executes programs by emulating a physical machine, which may be a system VM or a process VM. The system VM provides a complete system platform which supports the execution of a complete OS (operating system). The process VM is designed to run a single program. FIG. 7 is a system block diagram according to an embodiment of the invention. VMs 730_1 to 730_m may be practiced when the processing unit 610 loads and executes relevant program codes. In addition, the functionality of a hypervisor 710 is performed when the processing unit 610 loads and executes relevant program codes. The memory 650 may allocate space for a FIFO (First-In-First-Out) queue of each VM. FIG. 8 is a schematic diagram of VMs and FIFO queues according to an embodiment of the invention. The relationship between the VMs and the FIFO queues is one-to-one. The FIFO QUEUE 800_1 is mapped to the VM 730_1, the FIFO QUEUE 800_2 is mapped to the VM 730_2, and so on. The hypervisor 710 may receive a data access request from any of the VMs 730_1 to 730_m and push the data access request into the corresponding one of the FIFO queues 800_1 to 800_m. Each of the FIFO queues 800_1 to 800_m may be treated as a virtual storage device. The data access request may request to write data into the storage device 640, read data from an LBA range of the storage device 640, update data of an LBA range of the storage device 640, or delete data of an LBA range from the storage device 640. FIG. 9 is a schematic diagram for scheduling data access requests according to an embodiment of the invention. The hypervisor 710 may obtain a data access request from one of the FIFO queues 800_1 to 800_m according to QoS associated with the VMs and drive the storage device 640 according to the data access request for completing data insertion, read, deletion or update.

Figure 10:
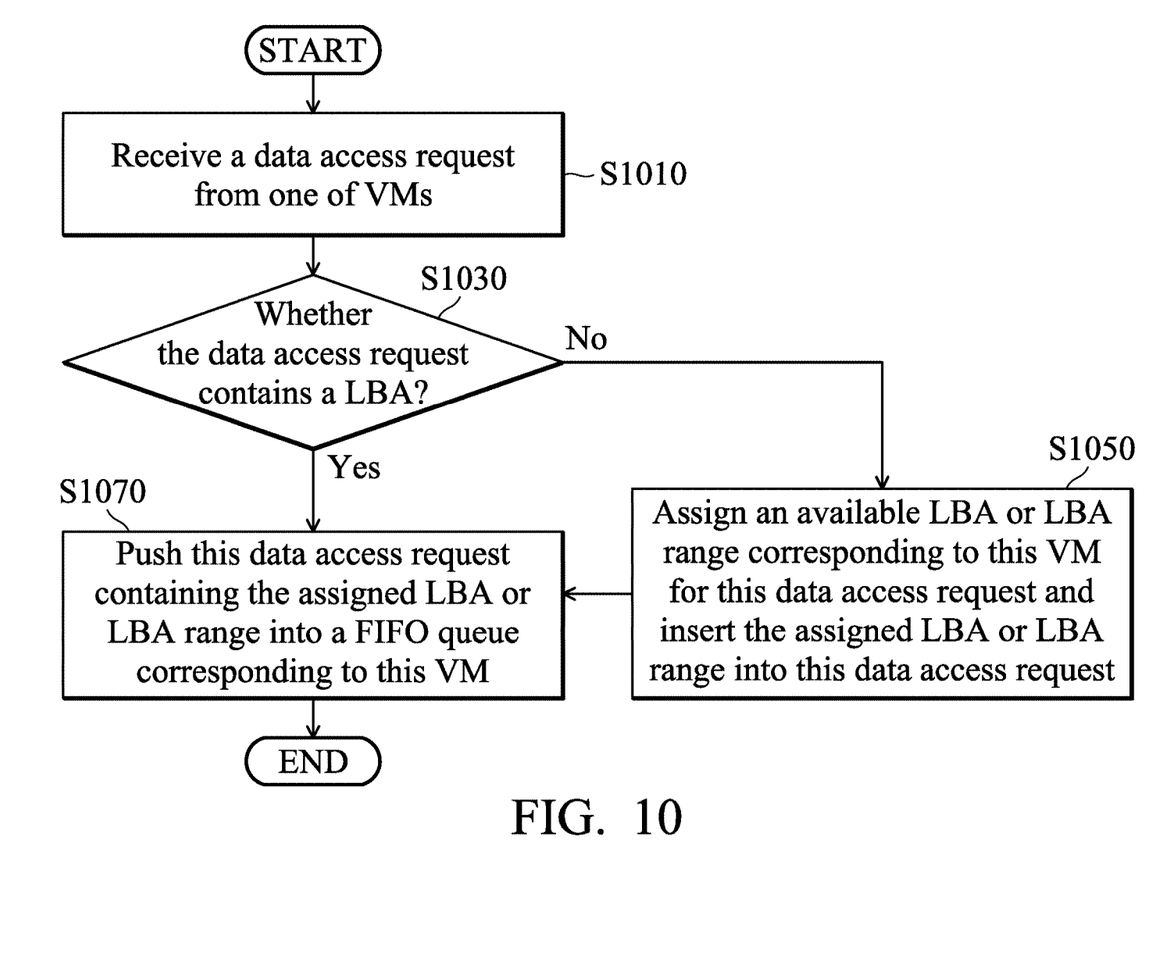
FIG. 10 is a flowchart illustrating a method for enqueuing data access requests according to an embodiment of the invention.

Embodiments for accessing a solid state disk for QoS contain two methods: enqueuing and dequeuing. The first one is employed to push a data access request from a VM into one of queues, and the second one is employed to obtain a data access request from one of the queues according to QoS of the VMs and process the obtained data access request. FIG. 10 is a flowchart illustrating a method for enqueuing data access requests according to an embodiment of the invention. The method is performed when the processing unit 610 loads and executes microcode, macrocode or software instructions of the hypervisor 710. The method starts to receive a data access request from one of VMs 730_1 to 730_m (step S1010). The data access request may request to write data into an arbitrary LBA or LBA range, write data into a designated LBA or LBA range of the storage device 640, read data from a designated LBA or LBA range of the storage device 640, update data of a designated LBA or LBA range of the storage device 640 or delete data of a designated LBA or LBA range from the storage device 640. Next, it is determined whether the data access request contains an LBA (step S1030). In step S1030, for example, if the data access request requests to write data into the storage device 640 for the first time, the data access request contains no LBA. If the data access request requests to update data of a specific location of the storage device 640, the data access request contains a designated LBA or LBA range. When the data access request contains an LBA (the "Yes" path of step S1030), the data access request is pushed into a FIFO queue corresponding to this VM (step S1070). Refer to FIG. 8, for example, when the VM 730_2 issues this data access request, this data access request is pushed into the FIFO queue 800_2. When the data access request contains no LBA (the "No" path of step S1030), an available LBA or LBA range corresponding to this VM is assigned for this data access request and the assigned LBA or LBA range is inserted into this data access request (step S1050), and this data access request containing the assigned LBA or LBA range is pushed into a FIFO queue corresponding to this VM (step S1070). In step S1050, for example, each of the VM 730_1 to 730_m may be associated with an LBA range. Table 1 describes exemplary associations of the VMs 730_1 to 730_m with LBA ranges:

TABLE 1

| VM | Reserved LBA range |
|---|---|
| 730_1 | LBA0000-LBA0999 |
| 730_2 | LBA1000-LBA1999 |
| 730_3 | LBA2000-LBA2999 |
| 730_4 | LBA3000-LBA3999 |

The reserved LBA range of the VM 730_1 is LBA0000-LBA0999, the reserved LBA range of the VM 730_2 is LBA1000-LBA1999, and so on. Table 2 describes other exemplary associations of the VMs 730_1 to 730_m with LBA ranges:

TABLE 2

| VM | Reserved LBA range |
|---|---|
| 730_1 | LBA0000-LBA0999; LBA1000-LBA1999 |
| 730_2 | LBA1000-LBA1999; LBA2000-LBA2999 |
| 730_3 | LBA2000-LBA2999; LBA3000-LBA3999 |
| 730_4 | LBA3000-LBA3999; LBA0000-LBA0999 |

One reserved LBA range may be shared by two of the VMs 730_1 to 730_m. Although Tables 1 and 2 describe several assignments of LBAs, those skilled in the art may use similar but different assignments for the VMs and the invention should not be limited thereto. It should be noted that, although the above embodiments describe a configuration in which the hypervisor 710 assigns available LBAs, those skilled in the art may devise each VM to record its reserved LBA range, resulting in steps S1030 and S1050 being omitted.

Figure 11:
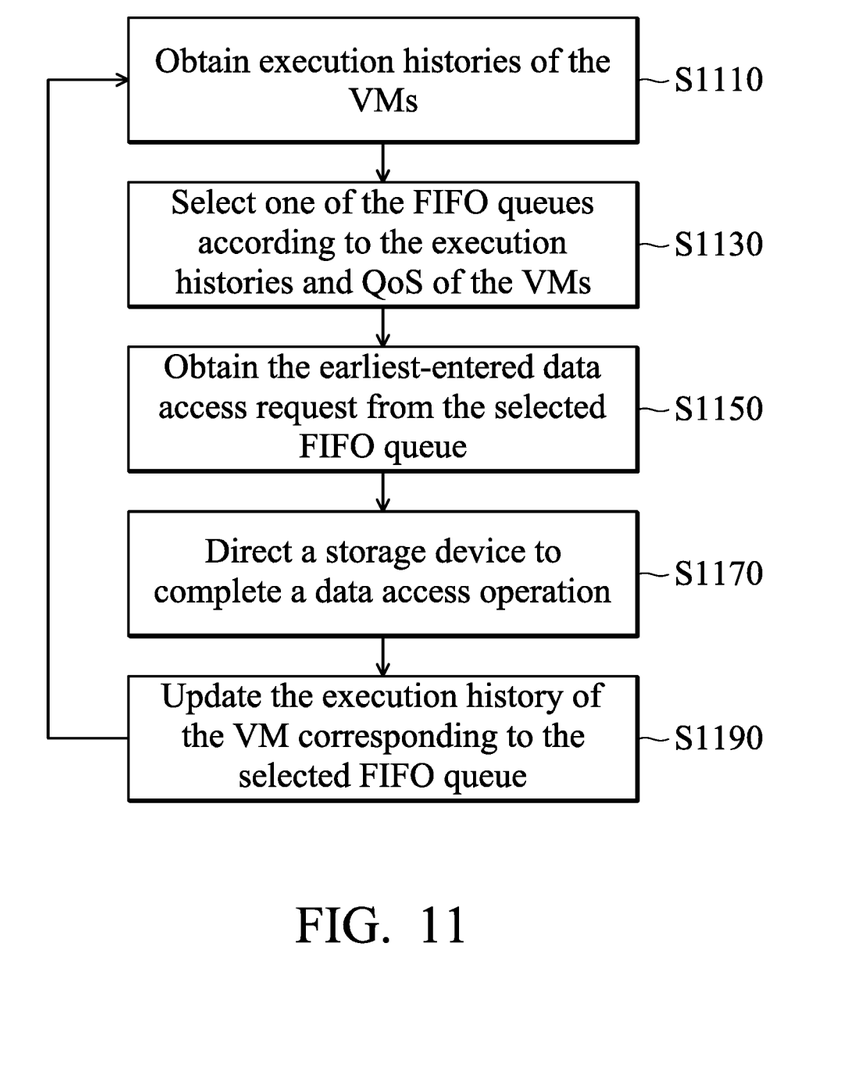
FIG. 11 is a flowchart illustrating a method for dequeuing data access requests according to an embodiment of the invention.

FIG. 11 is a flowchart illustrating a method for dequeuing data access requests according to an embodiment of the invention. The method repeatedly performs a loop when the processing unit 610 loads and executes microcode, macrocode or software instructions of the hypervisor 710. The method is considered as a process for scheduling data access requests in response to QoS of the VMs. In each iteration, execution histories of the VMs 730_1 to 730_m are obtained (step S1110), one of the FIFO queues 800_1 to 800_m is selected according to the execution histories and QoS of the VMs (step S1130), the earliest-entered data access request is obtained from the selected FIFO queue (step S1150), the storage device 460 is directed to complete a data access operation, such as reading, deleting, storing data, etc., according to the obtained data access request (step S1170), the execution history of the VM corresponding to the selected FIFO queue is updated, thereby enabling the data access requests to be scheduled according to the up-to-date execution history (step S1190). In step S1130, the QoS describes requirements of data access to the storage unit 180 through the VMs 730_1 to 730_m, such as throughput, latency and so on. The QoS and execution histories of the VMs 730_1 to 730_m may be practiced in specific data structures, such as data arrays, database tables, file records, etc., and stored in the memory 650.

In one example, assume QoS describes that throughputs of the VMs 730_1 to 730_4 are as averaged as possible and the execution histories indicate that throughputs of the FIFO queues 800_1 to 800_4 within a time period are 12, 11 12 and 12 MB (megabytes), respectively: The processing unit 610 selects the FIFO queue 800_2 (step S1130), obtains the earliest-entered data access request from the FIFO queue 800_2 (step S1150), and directs the storage device 640 to complete a data access operation according to the obtained data access request (step S1170). In another example, assume QoS describes a throughput per second of each of the VMs 730_1 to 730_4 of not less than 5 MB and the execution histories indicate that the throughputs per second of the FIFO queues 800_1 to 800_4 within a time period are 4.9, 6, 5.5 and 5.2 MB (megabytes), respectively: The processing unit 610 selects the FIFO queue 800_1 (step S1130), obtains the earliest-entered data access request from the FIFO queue 800_1 (step S1150), and directs the storage device 640 to complete a data access operation according to the obtained data access request (step S1170).

Although the embodiment has been described as having specific elements in FIGS. 1 to 3 and 6, it should be noted that additional elements may be included to achieve better performance without departing from the spirit of the invention. While the process flows described in FIGS. 10 and 11 include a number of operations that appear to occur in a specific order, it should be apparent that these processes can include more or fewer operations, which can be executed serially or in parallel (e.g., using parallel processors or a multi-threading environment).

While the invention has been described by way of example and in terms of the preferred embodiments, it should be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A method for accessing a solid state disk for QoS (quality of service), comprising:
   obtaining a plurality of execution histories of a plurality of VMs (virtual machines);
   selecting one from a plurality of FIFO (First-In-First-Out) queues according to the execution histories and QoS;
   obtaining a first data access request, which was entered earliest in the selected FIFO queue; and
   directing a storage device to complete a data access operation according to the first data access request;
   wherein the execution histories indicate throughputs of the FIFO queues within a time period or indicate the throughputs per second of the FIFO queues within a time period.

2. The method of claim 1, wherein the QoS describes requirements of data access to the storage unit through the VMs.

3. The method of claim 1, wherein the relationship between the VMs and the FIFO queues is one-to-one.

4. The method of claim 1, comprising:
   after completing the data access operation, updating the execution history of the VM corresponding to the selected FIFO queue.

5. The method of claim 1, comprising:
   obtaining a second data access request from one of the VMs; and
   pushing the second data access request into the FIFO queue corresponding to the source VM.

6. The method of claim 5, wherein the second data access request requests to write data into an arbitrary LBA (Logical Block Address) or LBA range of the storage device, write data into a designated LBA or LBA range of the storage device, read data from a designated LBA or LBA range of the storage device, update data of a designated LBA or LBA range of the storage device, or delete data of a designated LBA or LBA range from the storage device.

7. The method of claim 5, comprising:
   determining whether the second data access request contains an LBA; and
   when the second data access request does not contain the LBA, assigning an available LBA or LBA range corresponding to the source VM and inserting the assigned LBA or LBA range into the second data access request.

8. An apparatus for accessing a solid state disk for QoS (quality of service), comprising:
   a memory, allocating space for a plurality of FIFO (First-In-First-Out) queues; and
   a processing unit, coupled to the memory, obtaining a plurality of execution histories of a plurality of VMs (virtual machines); selecting one of the FIFO (First-In-First-Out) queues according to the execution histories and QoS; obtaining a first data access request, which was entered earliest in the selected FIFO queue; and directing a storage device to complete a data access operation according to the first data access request, wherein the execution histories indicate throughputs of the FIFO queues within a time period or indicate the throughputs per second of the FIFO queues within a time period.

9. The apparatus of claim 8, wherein the QoS describes requirements of data access to the storage unit through the VMs.

10. The apparatus of claim 8, wherein the relationship between the VMs and the FIFO queues is one-to-one.

11. The apparatus of claim 8, wherein, after completing the data access operation, the processing unit updates the execution history of the VM corresponding to the selected FIFO queue.

12. The apparatus of claim 8, wherein the processing unit obtains a second data access request from one of the VMs; and pushes the second data access request into the FIFO queue corresponding to the source VM.

13. The apparatus of claim 12, wherein the second data access request requests to write data into an arbitrary LBA (Logical Block Address) or LBA range of the storage device, write data into a designated LBA or LBA range of the storage device, read data from a designated LBA or LBA range of the storage device, update data of a designated LBA or LBA range of the storage device, or delete data of a designated LBA or LBA range from the storage device.

14. The apparatus of claim 12, wherein the processing unit determines whether the second data access request contains an LBA; and, when the second data access request does not contain the LBA, assigns an available LBA or LBA range corresponding to the source VM and inserts the assigned LBA or LBA range into the second data access request.

* * * * *